United States Patent
Wilde

[19]

[11] Patent Number: 6,157,386
[45] Date of Patent: Dec. 5, 2000

[54] MIP MAP BLENDING IN A GRAPHICS PROCESSOR

[75] Inventor: Daniel P. Wilde, Cedar Park, Tex.

[73] Assignee: Cirrus Logic, INC, Austin, Tex.

[21] Appl. No.: 08/949,177

[22] Filed: Oct. 10, 1997

[51] Int. Cl.$^7$ .................................................. G06T 11/40
[52] U.S. Cl. ...................... 345/430; 345/428; 345/431
[58] Field of Search ................................. 345/422, 428, 345/430, 431, 429

[56] References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,490,240 | 2/1996 | Foran et al. | 345/430 |
| 5,651,104 | 7/1997 | Cosman | 345/428 |
| 5,699,497 | 12/1997 | Erdahl et al. | 345/428 |
| 5,734,386 | 3/1998 | Cosman | 345/430 |
| 5,835,097 | 11/1998 | Vaswani et al. | 345/430 |
| 5,856,829 | 1/1999 | Gray III et al. | 345/422 |
| 5,949,426 | 9/1999 | Rich | 345/430 |

FOREIGN PATENT DOCUMENTS 9636011  11/1996  WIPO.

*Primary Examiner*—Mark Zimmerman
*Assistant Examiner*—Kimbinh T. Nguyen
*Attorney, Agent, or Firm*—Peter Rutkowski; Conley Rose; Robert P. Bell

[57] ABSTRACT

A graphics system includes a graphics controller for rendering polygons with texture using an improved MIP mapping technique in which texels from multiple MIP maps are blended together. The graphics controller includes a polygon engine for rendering the pixels in a polygon and at texture map engine for selecting texture elements ("texels") from an appropriate texture map to be applied to the pixels rendered by the polygon engine. The texture map engine generates texel coordinate values from pixel coordinate values provided by the polygon engine. Texel values are selected from a set of texture maps each map varying from the others by the level of detail of the texture in each map. The graphics controller computes a scale factor for each texel value according an are a bounded by adjacent texel coordinates generated by the texture map engine. The scale factor is then used to compute a weighted average of texels form more than one MIP maps. In the preferred embodiment, vectors are defined for each the adjacent texels and the area is determined from the magnitude of the cross product of the vectors.

38 Claims, 9 Drawing Sheets

MIP MAP BLENDING IN A GRAPHICS PROCESSOR

BACKGROUND OF THE INVENTION

A. Field of the Invention

The present invention relates generally to a graphics system for a personal computer. More particularly, the present invention relates to a method and apparatus for rendering polygons in a pixel grid. Still more particularly, the present invention relates to an improved method of applying texture to polygons.

B. Background of the Invention

Sophisticated graphics packages have been used for some time in expensive computer aided drafting, design and simulation systems. Increased capabilities of graphic controllers and display systems, combined with standardized graphics languages, have made complex graphics functions available in even the most routine applications. For example, word processors, spread sheets and desktop publishing packages now include relatively sophisticated graphics capabilities. Three-dimensional (3D) displays have become common in games, animation, and multimedia communication and drawing packages.

The availability of sophisticated graphics in PC's has driven a demand for even greater graphic capabilities. To obtain these capabilities, graphic systems must be capable of performing more sophisticated functions in less time to process greater amounts of graphical data required by modern software applications. In particular, there is a continuing need for improvements in software algorithms and hardware implementations to draw three-dimensional objects using full color, shading, texture mapping, and transparency blending.

The development of raster display systems has dramatically reduced the overall cost and increased the capabilities of graphic systems. In a raster display system, a set of orthogonal or horizontal scan lines, each comprising a row of pixels, forms an array or grid of pixels to represent the entire screen area The screen preferably comprises a cathode ray tube (CRT), LCD display, or the like, capable of scanning the entire pixel grid at a relatively high rate to reduce flicker. The pixel data preferably is stored in a frame buffer comprising dynamic random access memories (DRAM's), or more preferably video RAMs (VRAM's), where each pixel is represented by one or more bits depending upon the desired resolution. In many graphics systems, for example, each pixel is drawn or "rendered " with 24 bits of color information (8 bits for red, 8 bits for green, 8 bits for blue). Typical display systems are capable of drawing screens with multiple colors at a variety of screen resolutions, including resolutions of 640 pixels×480 pixels, 800×600, 1024×768, 1280×1024, or even higher pixel value combinations, depending upon the software drivers and the hardware used.

Typically, a video controller scans and converts the pixel data in the frame buffer to provide control signals for the screen system. In particular, the video controller renders the screen pixels, typically from the top of the screen to the bottom and from left to right, converting pixel data into color intensity values each pixel. In a color graphics system using a CRT, three separate beams are controlled for each of the primary colors, where the intensity of each of the beams is determined by the pixel value corresponding to the respective colors. A similar system is used for LCD displays.

Other improvements have been made in the hardware realm. Graphics processors and accelerators are available with software drivers that interface the host central processing unit (CPU) to the graphics processor. In general, the software driver receives information for drawing objects on the screen, calculates certain basic parameters associated with the objects and provides these to the graphics processor. The software driver then sends a command for the graphics processor to draw the object into the frame buffer. A graphics processor may use interpolation techniques in which the fundamental information for the object to be drawn comprises a set of initial and incremental parameters. As explained below, the graphics processor loads or otherwise receives the initial parameters for rendering a first pixel, and then interpolates the remaining pixels in an object by using the incremented parameters until the object is complete.

An exemplary interpolation method for drawing a typical polygon is shown in FIG. 1 in which polygon 30 represents a wall extending from the foreground 34 to the background 36. Polygon 30 can be subdivided into two triangles 32 and 40. In general, however, a polygon is subdivided into as many triangles as are necessary to represent the polygon. For example, ten thousand triangles or more may be required to create a realistic looking image of a human face. Graphics objects typically are represented with a collection of triangles because triangles are simple geometric shapes that can be characterized with relatively few values.

Referring still to FIG. 1, each triangle 32, 40 may be drawn in two portions, such as portions 47, 49 of triangle 40. To render triangle 40, for example, a software driver receives vertex information (including x, y coordinates of each vertex 41, 42, 43) and identifies a main slope line 45 extending the vertical length (in the y direction) of triangle 40 between vertices 41 and 43. The other two sides 51, 53 of triangle 40 are referred to as opposite slopes. The polygon 40 is interpolated using orthogonal (ORTHO) horizontal scan lines of pixels that extend from the main slope 45 to the opposite edges 51, 53. ORTHO Scan lines 63, 65, 67 represent the first three scan lines for triangle 40. The vertical or y parameter is used as a reference coordinate, so that the y pixel value is preferably incremented (or decremented depending on whether the triangle is rendered from top to bottom or bottom to top) by one for each scan line. A value for the main slope 45 is calculated as an initial condition and is used to compute the x coordinate of the first pixel in each scan line (i.e., the pixels on of the main slope). The software driver also determines initial and incremental width values for the scan lines and intepolates the width rather than edge walking the opposite slopes. The interpolated width value is loaded into a counter and decremented for each pixel in the current scan line. When the width counter becomes zero or otherwise reaches terminal count, the counter asserts a terminal count signal indicating that the scan line is complete.

Using such interpolation techniques, each triangle 32, 40 is drawn one row or horizontal scan line of pixels at a time. For each scan line of triangle 40 (such as scan lines 63, 65, 67), pixels are rendered from the main slope 45 to the opposite edges 51, 53. In the first scan line 63, vertex pixel 41 is rendered. In the second scan line 65, pixels 52 then 53 are rendered. In the third scan line 67, pixels 54, 55, 56 are rendered.

Graphics processors, such as the GD5464 manufactured by Cirrus Logic, are capable of applying texture to polygons through a process referred to as texture mapping. Texture mapping techniques generally apply a bitmapped texture image to a polygon on the screen. A texture map typically is a two dimensional array of texture elements ("texels") that define a texture such as a brick, a carpet design, the grain of wood or any other texture that might be applied to an object on a computer screen. Referring now to FIG. 2, an exemplary brick texture 44 is applied to polygon 30 to create the appearance of a brick wall. The brick texture 44 is represented by a texture map. The texture map used in FIG. 2 may represent only a single brick which is applied repeatedly to polygon 30 to cover the entire polygon with bricks.

Using standard techniques, the texture map associated with the texture 44 is applied to polygon 30 in such a way to give the appearance of perspective to the brick wall of FIG. 2. To further improve upon the realism of the brick wall, the bricks that are close to the viewer (brick 59 for example) preferably are shown with greater detail than the bricks in the distance (brick 61). The detail includes the imperfections in the exposed surface of brick 59, the mortar between bricks and any other detailed desired. Detail in the surface of a road close to the viewer, for example, might include oil stains and cracks. Such detail normally could not be seen in the distant brick 61. Accordingly, the graphics processor uses different versions of the brick texture map to account for differences in the level of detail in an object drawn with perspective. Each version is itself a texture map that includes a predetermined amount of detail. The texture map used to render brick 61 would not include the imperfections and other detail that could be seen in brick 59. Thus, a particular texture, such as the brick of FIG. 2, may include two or more texture maps representing the brick with varying levels of detail. MIP (multim in parvum) mapping is a technique by which the graphics processor selects a texture map with an appropriate level of detail (also referred to as a MIP map) to render a polygon. Using MIP mapping, the graphics processor switches between the various level of detail texture maps as the polygon is rendered.

The desire for sophisticated and realistic computer graphics requires the graphics hardware and software to deliver high performance. Performance becomes especially critical for computer games which typically include moving objects. Standard MIP mapping techniques for switching between various level of detail texture maps generally include computationally intensive operations and require numerous memory accesses that impair a graphics system's ability to deliver detailed, realistic, three-dimensional moving images. Further, known MIP mapping techniques often switch between MIP maps in such a way as to cause noticeable transitions in the texturing that is applied to the polygons.

Accordingly, it would be desirable to develop a graphics system that provides a MIP mapping scheme that requires relatively few memory accesses and computations. Further, it would be desirable to provide a graphics system that reduces or eliminates the transitions in texturing characteristic of many previous MIP mapping schemes. Such a system would provide increased performance while also providing high quality graphics.

SUMMARY OF THE INVENTION

A graphics system includes a graphics controller for rendering polygons with texture using an improved MIP mapping technique. The graphics controller includes a polygon engine for rendering the pixels in a polygon and a texture map engine for determining texture element ("texel") values from one or more texture maps to be applied to the pixels rendered by the polygon engine. The texture map engine generates texel coordinate values from pixel coordinate values provided by the polygon engine. A set of texture maps is used to represent a single texture with each texture map in the set representing a different level of detail of texture. The graphics controller either selects a texel value from one texture map or blends together two texel values from two texture maps based upon the area bounded by adjacent texels. The graphics controller determines a coordinate of a texel for every pixel coordinate in the polygon and calculates the area bounded by neighboring texel values by calculating the cross product of vectors connecting pairs of adjacent texel coordinates.

The graphics controller compares the calculated areas with ranges of values and selects a single texel value to render a pixel or blends two texel values together based on which range of values each area falls. Some ranges of area values require the graphics processor to select a single texel value from a texture map, while other ranges require blending of texel values from two texture maps. If the area is within a range of values requiring blending, the texture map engine computes a weighted average of texel values from two texture maps using the calculated area as a scale factor. The graphics processor calculates an area for each texel coordinate and selects a single texel value from a single texture map or blends two texel values together on a pixel-by-pixel basis while rendering the polygon.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF A PREFERRED EMBODIMENT

Figure 3:
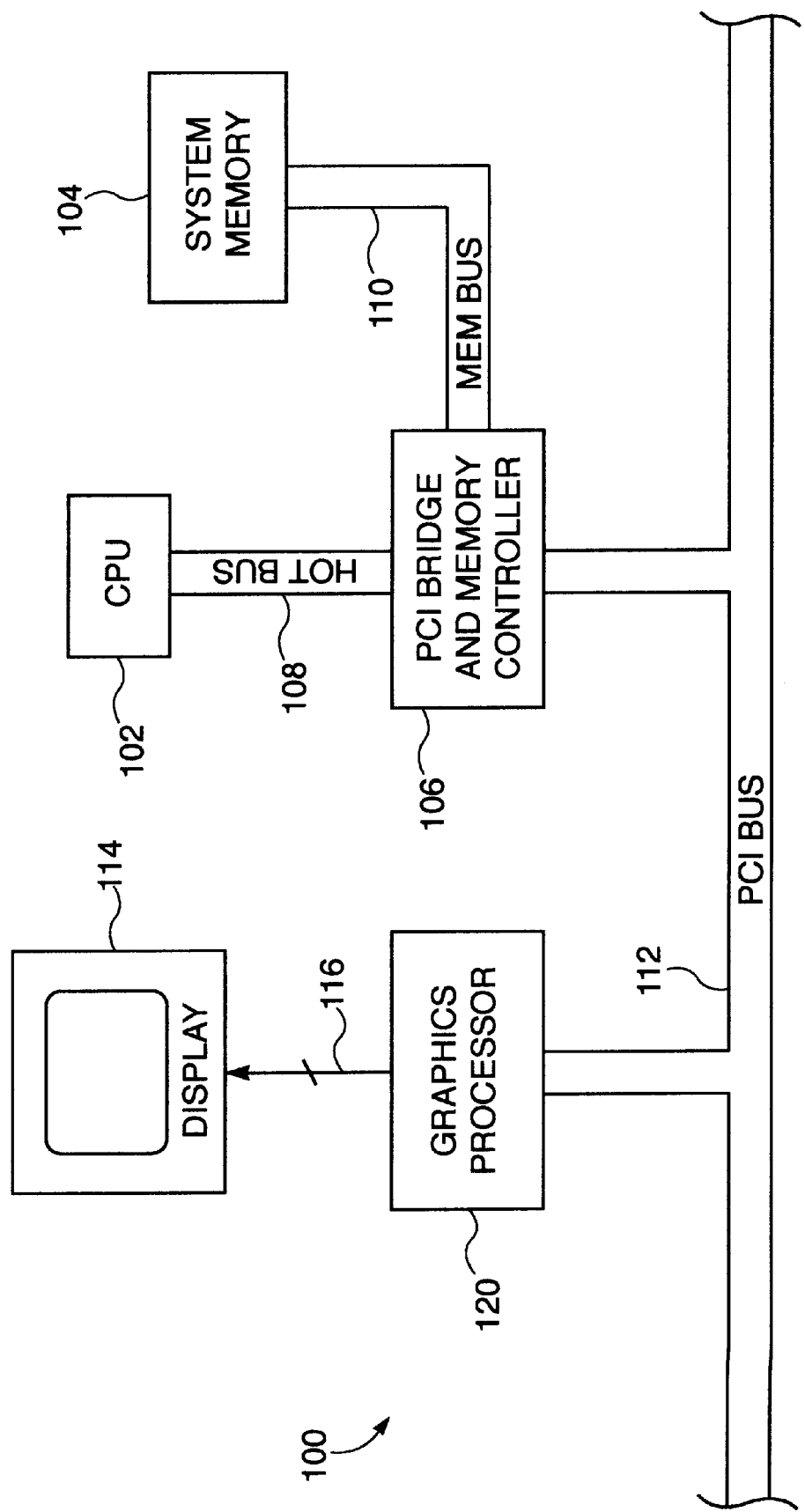
FIG. 3 is a general block diagram of a graphics system including a graphics processor in accordance with the preferred embodiment.

Referring now to FIG. 3, a computer system 100 constructed in accordance with a preferred embodiment generally includes CPU 102, system memory 104, a peripheral computer interconnect ("PCI") bridge and memory controller 106, a graphics processor 120, and a display 114. The CPU 102, system memory 104, PCI bridge 106 and display 114 preferably are known components. The CPU 102 may include any available processor such as the Pentium MMX®, K6®, or any other processor capable of operating a computer system in a fashion consistent with the preferred embodiment. The system memory 104 preferably includes standard dynamic random access memory ("DRAM"), synchronous DRAM, or any other suitable type of memory. The PCI bridge and memory controller may include any suitable off the shelf device or may be a custom design. Display 114 includes standard cathode ray tube ("CRT") displays, flat panel displays, or any other display device capable of displaying graphics.

The CPU 102 connects to the PCI bridge and memory controller 106 via a host bus 108 which includes address, data, and control lines for transferring data. The PCI bridge and memory controller 106 also connects to system memory 104 via a memory bus 110 which also includes address, data, and control lines suitable for transferring data between system memory 104 and PCI bridge and memory controller 108. The CPU 102 may initiate read and write cycles to system memory 104 by way of host bus 108, PCI bridge and memory controller 106, and memory bus 110 according to known techniques.

A system bus 112, preferably including a PCI bus, although other bus architectures are also acceptable, connects the PCI bridge and memory controller 106 to graphics processor 120. It should be recognized by those of ordinary skill in the art that other devices besides those shown in FIG. 3 may also connect to the PCI bus 112. Examples of other devices include extended memory cards, video cards, and network cards, video cards, and network cards. Further, other bus standards besides the PCI bus, such as the advanced graphics port ("AGP") bus may be used as the system bus 112. If system bus 112 is implemented as an AGP bus, then the bridge and memory controller 106 is constructed so as to couple to an AGP bus. Graphics data in the form of a display list is transferred between CPU 102 and graphics processor 120 by way of host bus 108, PCI bridge and memory controller 106, and PCI bus 112. Once graphics data is received by graphics processor 120 over the PCI bus 112, the graphics processor manipulates the data to provide appropriate signals over lines 116 to display 114 for displaying objects on the display.

Figure 1A:
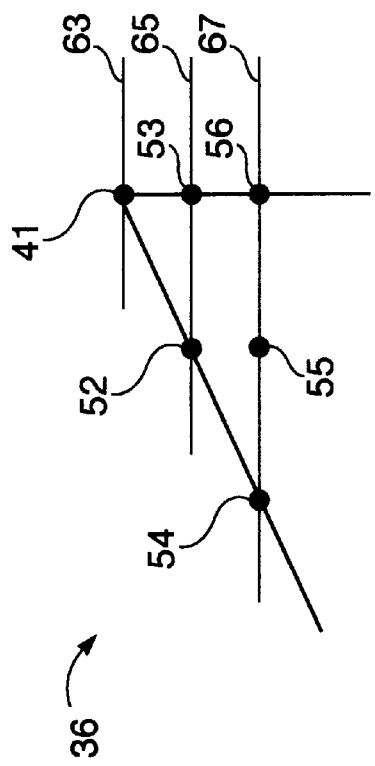
FIG. 1A is a blow-up of a portion of the wall of FIG. 1.
Figure 1:
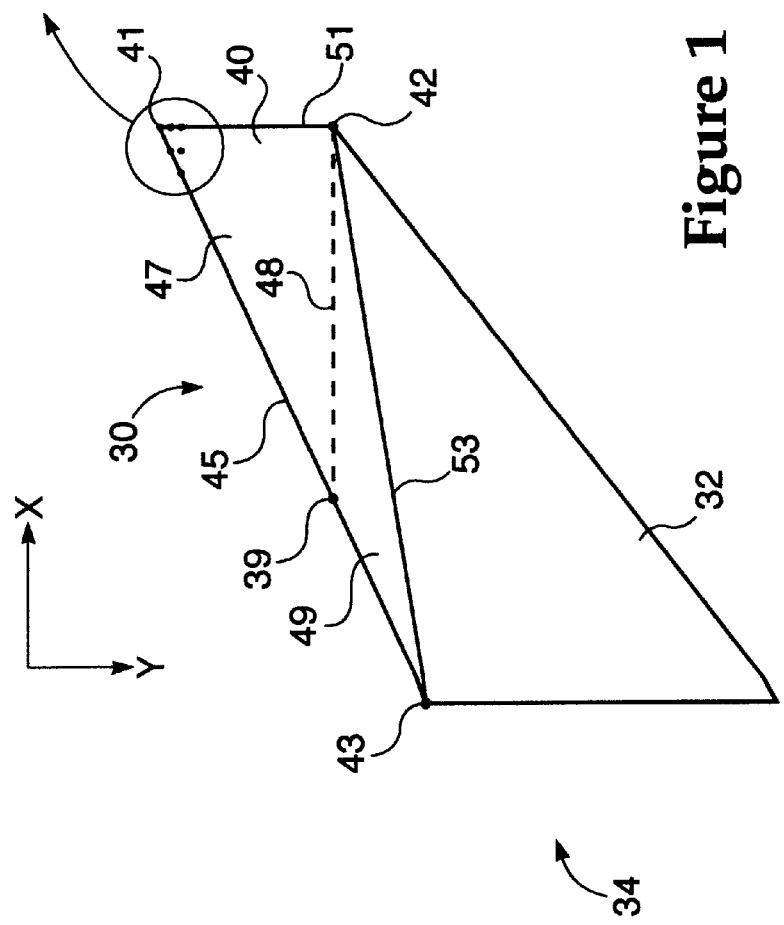
FIG. 1 is an exemplary polygon representing a wall drawn with perspective in a graphics system.
Figure 4:
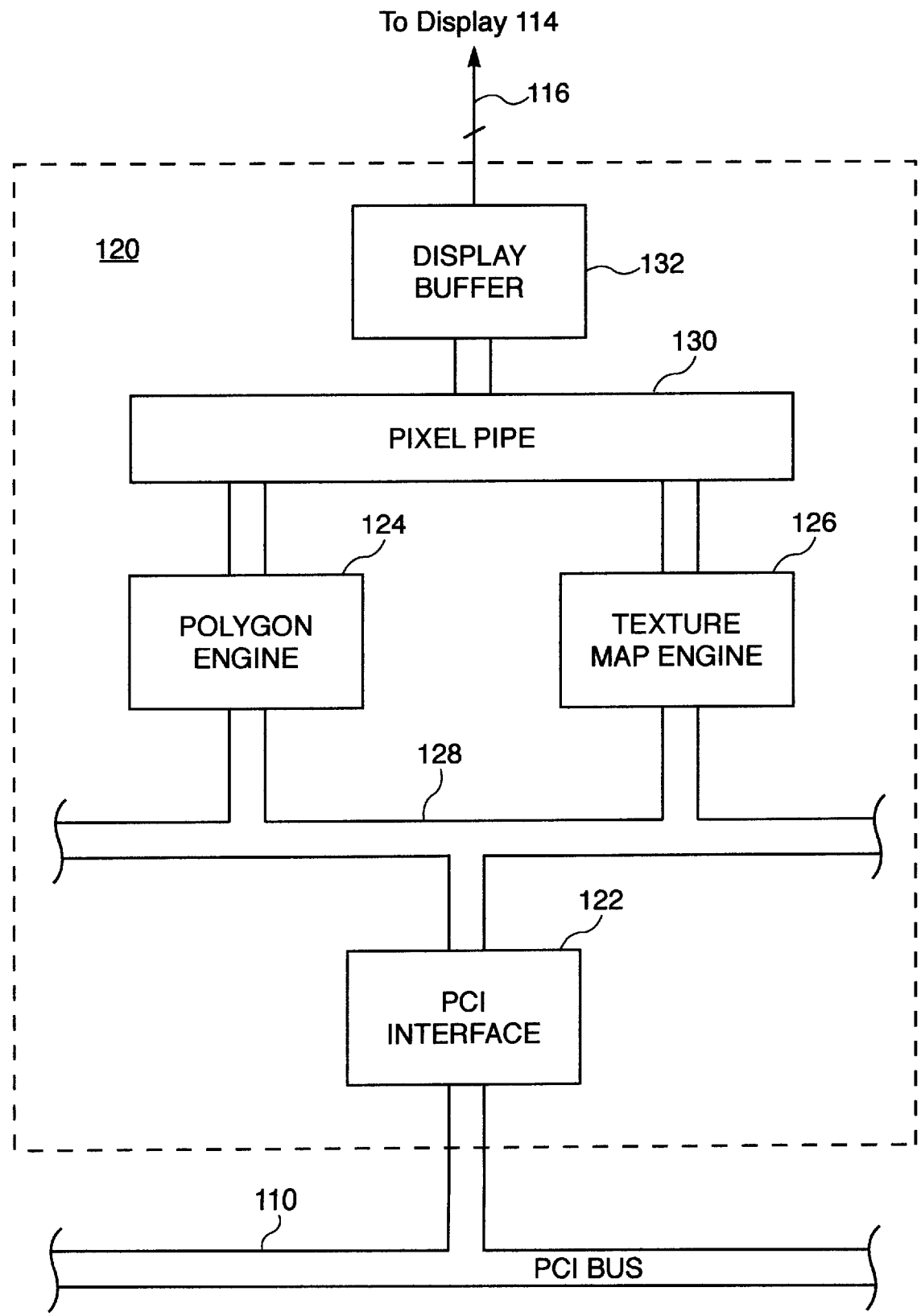
FIG. 4 is a more detailed schematic diagram of the graphics processor of FIG. 4 in accordance with the preferred embodiment.

Referring now to FIGS. 1 and 4, the graphics processor 120 of the preferred embodiment includes a PCI interface 122, a polygon engine 124, a texture map engine 126, a pixel pipe 130, and a display interface 132. The PCI interface 122, polygon engine 124, and texture map engine 126 couple together via bus 128. Pixel x,y addresses are provided over bus 128 to the texture map engine 126 and are used by texture map engine 126 to generate texture map addresses, as explained below. The polygon engine 124 and the texture map engine 126 couple to the pixel pipe 130. The display interface 132 uses information provided to it from the pixel pipe 130 to provide appropriate signals to the display 114 over lines 116.

The polygon engine 124 provides x,y pixel coordinates along with lighting and depth information to the pixel pipe 130. Concurrently, the texture engine 126 calculates a u,v coordinate for each pixel and fetches the texel color value (or simply "texel") from the appropriate texture map. The pixel pipe 130 performs basic 3D operations on the pixel color, depth, and texel values to generate a final color value to be applied to the pixel. This final color value is stored in the display buffer 132.

In accordance with a preferred embodiment, graphics processor 120 receives data in the form of a display list from the CPU 102 or system memory 104 via the PCI bus 112. The display list is stored in a register file in graphics processor 120 or memory (not shown) directly coupled to the graphics processor 120. The display list includes all information needed to draw a polygon. It is assumed each polygon includes an upper or main triangle (such as triangle 47 in FIG. 1) abutting a lower or opposite triangle (such as triangle 49). The values in the display list include the data needed to render both upper and lower triangles. Table I below includes an exemplary display list identifying the values that are included in the list (first column of Table I) and the description of each value (second column). References to X and Y values refer to the x, y coordinates of pixels on the display (referred to as x, y pixel space). References to U and V values refer to the coordinates of texels in a texture map which are identified as u,v coordinates. The u, v coordinate system of a texture map is referred to as u, v texture map space.

TABLE I

Display List.

| NAME | DESCRIPTION |
| --- | --- |
| X | Initial x pixel coordinate |
| Y | Initial y pixel coordinate |
| R | Initial Red value for initial x, y pixel |
| G | Initial Green value for initial x, y pixel |
| B | Initial Blue value for initial x, y pixel |
| ΔX MAIN | Main slope value: this value is added to the initial x coordinate on each step in y to generate the x starting point for each new ORTHO scan line. |
| Y COUNT | Top count: Bottom count concatenated. Determine the number of steps in y for the upper and lower portions of the triangle drawn. |
| X WIDTH MAIN | Initial upper width value. Width of the first ORTHO scan line in x of the upper (main) triangle |
| X WIDTH OPP | Initial bottom width value. Width of the first ORTHO scan line in x of the lower (opposite) triangle |
| ΔX WIDTH MAIN | Main width slope. This value is the amount by which the width of each scan line in x of the upper (main) triangle is adjusted on each step in y. |
| ΔX WIDTH OPP | Opposite width slope. This value is the amount by which the width of each scan line in x of the lower (opposite) triangle is adjusted on each step in y. |
| ΔR MAIN | Red main slope. This value is the amount by which the red color component start value for each scan line in x is adjusted on each step in y. |
| ΔG MAIN | Green main slope. This value is the amount by which the green color component start value for each scan line in x is adjusted on each step in y. |
| ΔB MAIN | Blue main slope. This value is the amount by which the blue color component start value for each scan line in x is adjusted on each step in y. |
| ΔR ORTHO | Red ORTHO slope. This value is the amount by which the red color component is adjusted for each step in x along a scan line. |
| ΔG ORTHO | Green ORTHO slope. This value is the amount by which the green color component is adjusted for each step in x along a scan line. |
| ΔB ORTHO | Blue ORTHO slope. This value is the amount by which the blue color component is adjusted for each step in x along a scan line. |
| Z | Initial z pixel coordinate. |
| ΔZ MAIN | Z main slope value. Added to z to generate starting z coordinate for each new scan line. |
| ΔZ ORTHO | Z ORTHO value. This value is the amount by which the z coordinate is adjusted along a scan line on each step in x. |
| V | Initial v coordinate of first texel address in texture map being used. |
| U | Initial u coordinate of first texel address in texture map being used. |
| ΔV MAIN | V main slope value. Amount by which the v texel coordinate start value is adjusted on each step in y. |
| ΔU MAIN | U main slope value. Amount by which the u texel coordinate start value is adjusted on each step in y. |
| ΔV ORTHO | V ORTHO slope value. Amount by which the v texel coordinate is adjusted on each step in x. |

TABLE I-continued

Display List.

| NAME | DESCRIPTION |
|---|---|
| ΔU ORTHO | U ORTHO slope value. Amount by which the u texel coordinate is adjusted on each step in x. |
| ΔV2 MAIN | Amount by which the ΔV MAIN value is adjusted per main slope step. |
| ΔU2 MAIN | Amount by which the ΔU MAIN value is adjusted per main slope step. |
| ΔV2 ORTHO | Amount by which the ΔV ORTHO is adjusted per ortho step. |
| ΔU2 ORTHO | Amount by which the ΔU ORTHO is adjusted per ortho step. |

It should be recognized that a display list may, and often will, include additional values. Thus, the values in the display list of Table I are exemplary only and are not exhaustive of all the: values included in a typical display list.

The graphics processor 120 uses the values in the display list in Table I to draw a polygon and apply texture. How the graphics processor 120 renders a polygon with texture will now be described with reference to triangle 40 (FIG. 1). Referring to FIG. 1 and Table I, triangle 40 preferably is divided into two portions—an upper or main triangle 47 and a lower or opposite triangle 49 separated from main triangle 47 by dashed line 48. For purposes of simplicity, the following discussion assumes the triangle 40 is drawn from top to bottom.

Triangle 40 is drawn in a series of horizontal ORTHO scan lines in which each scan line includes one or more pixels. Because the ORTHO scan lines are horizontal, only the x coordinate changes from one pixel in the scan line to the next. Further, the polygon engine 124 preferably increments the x coordinate by one as the graphics processor renders each pixel in succession along an ORTHO scan line. To draw the upper or main triangle 47, the graphics processor needs to know or calculate the coordinate of the first pixel in the triangle (pixel 41, for example), the coordinate of the first pixel in each ORTHO scan line, the number of pixels in each scan line, and the number of scan lines in the triangle. These values can be determined from the display list in Table I. The coordinate of the initial pixel is X, Y. The coordinate of the first pixel in each successive scan line is calculated by adding ΔX MAIN to X. It should be recognized that ΔX MAIN may be a positive or negative number depending on the slope of the line on which the first pixels in each ORTHO scan line lie. Thus, if the line on which the first pixels lie slopes down and to the left (as is the case for the main slope line 45 in FIG. 1), then ΔX MAIN is a negative number because the x, y coordinate axes in the preferred embodiment have x coordinates increasing from left to right (y coordinates increase from the top of the display to the bottom). Thus, adding a negative value to an x coordinate produces an x coordinate to left on the display. Conversely, if the line on which the first pixels lie slopes down and to the right, ΔX MAIN will be a positive number. If the line is vertical, ΔX MAIN has a value of 0.

The number of pixels in each ORTHO scan line is calculated by adding ΔX WIDTH MAIN to the width (.e., number of pixels in the x direction) of the previous scan line. For example, the ΔX WIDTH MAIN value for triangle 47 is 1. The width of the first scan line 63 (X WIDTH MAIN) is 1 because there is only 1 pixel (pixel 41) in the first scan line 63. Adding a ΔX WIDTH MAIN value of 1 to the X WIDTH MAIN value of 1 provides a width of the second scan line 65 of 2. Thus, there are 2 pixels in the second scan line (pixels 52, 53). The graphics processor then adds the ΔX WIDTH MAIN value of 1 to the width of the second scan line (2 pixels) and thereby determines that there are 3 pixels in the third scan line 67 (pixels 54, 55, 56). Drawing curvilinear shapes ("warping") can be achieved by varying ΔX WIDTH MAIN throughout the interpolation process.

The number of scan lines in a triangle is provided by the Y COUNT value which includes the number of scan lines in both the upper (main) triangle and lower (opposite) triangle. The portion of the Y COUNT value representing the number of scan lines in the main triangle preferably is loaded into a counter and decremented by one for each ORTHO scan line drawn. When the counter reaches its terminal count, the graphics processor has completed drawing the main triangle.

After the main triangle 47 is drawn, the opposite triangle 49 is then drawn using the same technique. The first pixel to be drawn preferably is pixel 39 and the width of the first scan line is the number of pixels along dashed line 48.

Figure 2:
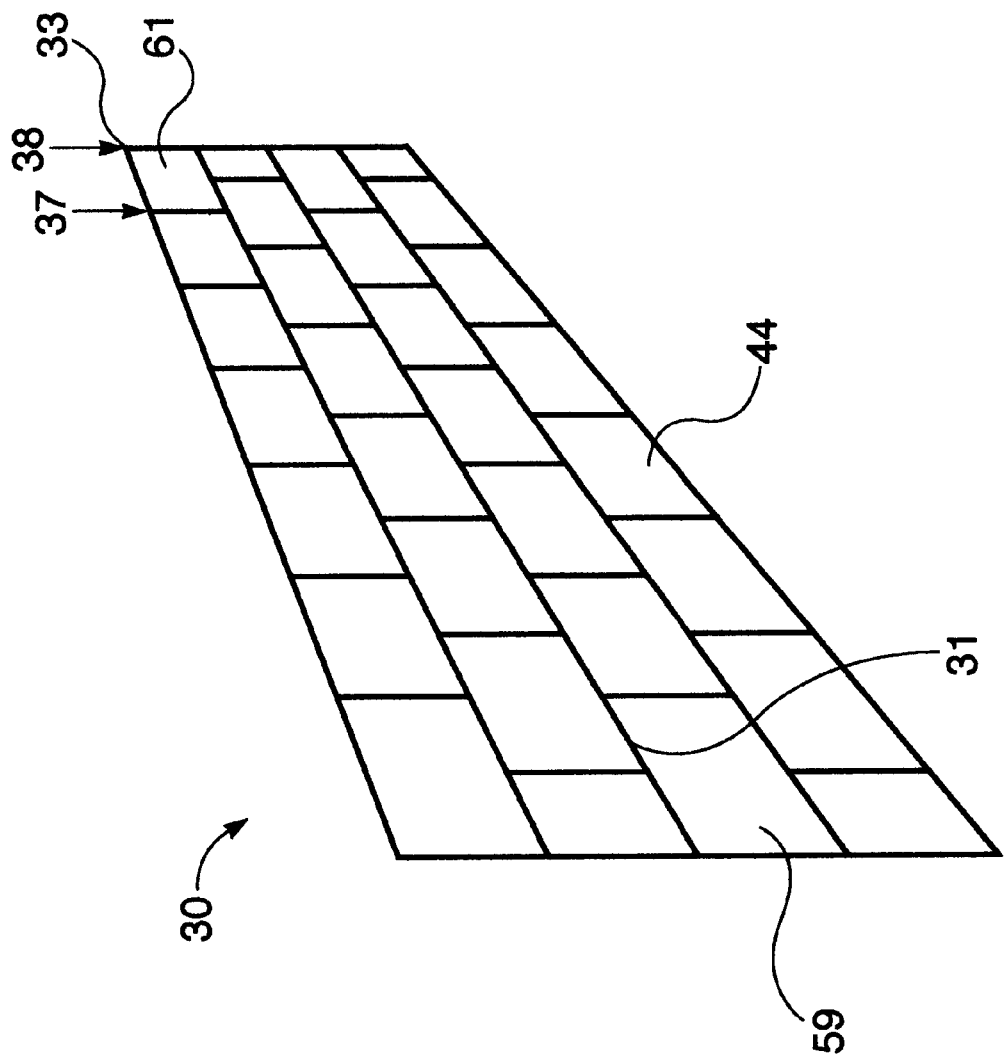
FIG. 2 is the exemplary wall of FIG. 1 drawn with brick texture maps to create the appearance of a brick wall.
Figure 5:
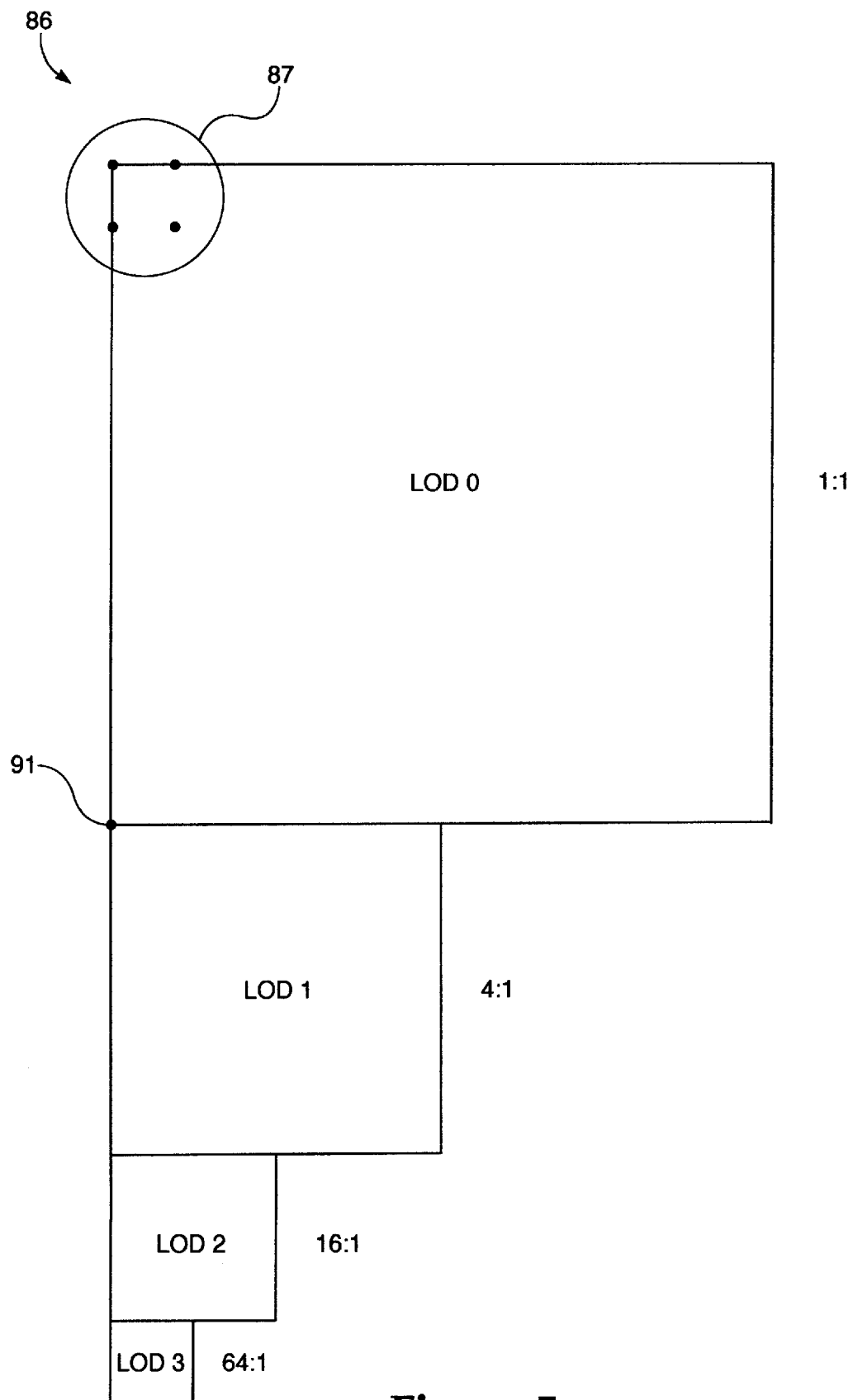
FIG. 5 shows multiple texture maps with varying levels of detail used to render polygons.

In accordance with a preferred embodiment, the texture map engine 126 applies texels to each pixel in the triangles drawn by polygon engine 124. The texels are stored in a texture map and are accessed using values in the display list in Table I above. Because polygons are often drawn with perspective, a set of texture maps in which each texture map has a particular level of detail that is different from the other texture maps in the set is used to render the polygon. Referring now to FIG. 5, set of texture maps 86 preferably includes four levels of detail ("LOD")—LOD0, LOD1, LOD2, and LOD3. Each LOD is itself a texture map. All four LOD's are maps of the same basic texture differing only by the amount of detail in each map. LOD0 provides the most level of detail of any of the maps and is used for those portions of polygons that are close to viewer in which maximum detail is preferred (such as brick 59 in FIG. 2). LOD1 provides the next most detail. LOD2 provides the next most level of detail after LOD0 and LOD1. Finally, LOD3 provides the least amount of detail and is used for distant portions of a polygon in which little detail is preferred (such as brick 61 in FIG. 2). The LOD's may be any size desired. In accordance with a preferred embodiment, LOD0 includes 1024 rows and 1024 columns of texel values. Each texel value is represented by a combination of red, green, and blue color values and is one or more bytes long.

It should be apparent that in x, y pixel space polygons are drawn by providing color values to each and every pixel in an ORTHO scan line, incrementing the y coordinate to the next scan line and repeating the process. The texture map engine generates u,v texel coordinates. The texel from the texture map associated with the u,v coordinate is then selected to be applied to the x,y pixel coordinate. Any other scheme for selecting texels from a texture map, such as bilinear averaging, is also consistent with the preferred embodiment.

Unlike rendering pixels in x,y space in which each pixel is rendered, in u, v texture map space the texture map engine 126 may skip texels as it converts pixel coordinates to texel coordinates. Referring again to FIGS. 2 and 5, the foreground brick 59 is rendered using LOD0 for maximum detail. Thus, all 1024×1024 (1M) texels in LOD0 may be used to render brick 59. Brick 61 in the distant is drawn smaller than brick 59 to provide the illusion of perspective. Thus, there are fewer pixels used to render brick 61 than brick 59. Because there may be many more texels in LOD0 than pixels in brick 61, not all of the texels from LOD0 will be selected by the texture map engine 126 when converting x,y coordinate to u,v coordinates. It thus is preferable to use a reduced or compressed version of LOD0 to render brick 61. LOD1–LOD3 provide compressed versions of LOD0, varying by the amount of compression. LOD1 preferably is one fourth of the size of LOD0 and includes 512 rows and 512 columns of texels. As such, LOD1 represents a four to one ("4:1") compression of LOD0. That is, LOD1 includes the same basic texture as LOD0 (albeit with less detail) in a texture map one-fourth the size of LOD0. The 4:1 compression is achieved by averaging four pixels in LOD0 (such as pixels 87 in FIG. 5) to produce one pixel in LOD1, although other techniques for generating the LOD's are possible. LOD2 and LOD3 also include the same basic texture as LOD0 with varying degrees of compression. LOD2 includes 256 rows and columns of texels and thus is one sixteenth of the size of LOD0 (a compression of 16:1). Finally, LOD3 is one sixty-fourth of the size of LOD0 (64:1 compression) and includes 128 rows and columns of texels.

Selecting an appropriate LOD provides higher quality images and is more efficient than using a texture map with maximum detail. Using a texture map with more detail than that necessary for the polygon to be rendered often makes the polygon appear to sparkle resulting in art unrealistic appearance. Additionally, texels are normally read from system memory in a block of data that is stored in cache memory (not specifically shown) according to known techniques. In accordance with the preferred embodiment, computer system 100 reads an 8×8 block of 64 texels from system memory 104 when a texel value is desired and stores the 64 texel block in high speed cache memory. When the next texel is needed from the texture map, there is a substantial likelihood that the needed texel is one of the 64 texels already stored in cache memory (a cache "hit"). Accesses to cache memory occur at a much higher speed than accesses to standard system memory 104, thereby speeding up the graphics process. If the next texel required is not one of the texels already stored in cache memory (a cache "miss"), a new 8×8 block of 64 texels must be read, and cached, to access the required texel value. Thus, using LOD0 when a smaller, more compressed LOD is appropriate slows the texture mapping process because a system memory access may be required for every texel needed. Instead, the graphics processor 120 increases the probability of a cache hit by using an appropriately sized LOD.

Figure 6:
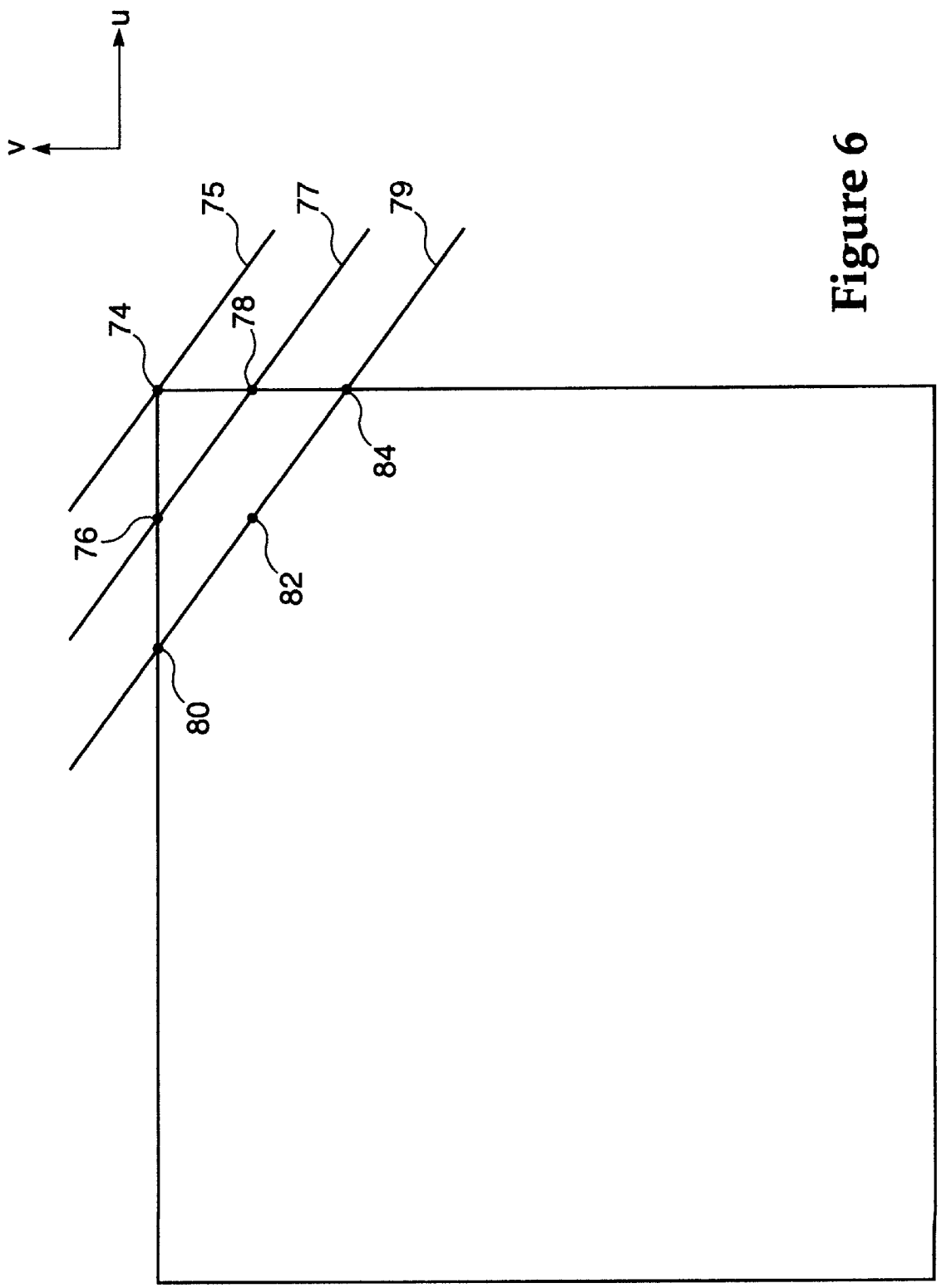
FIG. 6 shows an exemplary texture map and the selection of texels used to render a polygon.

Referring now to FIGS. 1 and 6, texture map engine 126 uses texels from an exemplary texture map 70 to apply to triangles 47, 49. It should be apparent that selection of texels in u, v space from texture map 70 does not necessarily proceed along horizontal rows as is the case for rendering polygons in x, y space. For example, if texture map 70 is applied to polygon 40, texel 74 may be the first texel selected to be applied to the first pixel rendered (pixel 41). Further, texels 76, 78, 80, 82, 84 would be applied to pixels 52, 53, 54, 55, 56, in order. Thus, ORTHO scan lines in u, v space (such as scan lines 75, 77, 79) may lie at arbitrary angles.

Unlike polygon rendering in which only the x coordinate changes from one pixel to the next along an ORTHO scan line in x, y pixel space, both the u and v coordinate may change from one texel to the next along a single ORTHO scan line in texture space. The U and V values from Table I provide the coordinate of the first texel to be used from the texture map. The ΔU ORTHO and ΔV ORTHO values are used to calculate the u, v coordinate for each texel along an ORTHO scan line. Further, the ΔU2 ORTHO and ΔV2 ORTHO values are used to change the ΔU ORTHO and ΔV ORTHO values, allowing for perspective correct texture mapping. The ΔU ORTHO and ΔV ORTHO values are used to calculate the u, v coordinate for each texel along an ORTHO scan line. The ΔU MAIN and ΔV MAIN values are used to compute the u, v coordinate for the first texel in a particular ORTHO scan line. Perspective correct texture mapping is further implemented by using the ΔU2 MAIN and ΔV2 MAIN values to change the ΔU MAIN and ΔV MAIN values as the main slope is traversed. The MIP mapping technique of the present invention uses the ΔU ORTHO, ΔV ORTHO, ΔU MAIN, ΔV MAIN values to blend together texel values from two or more LOD's as explained below.

Figure 7:
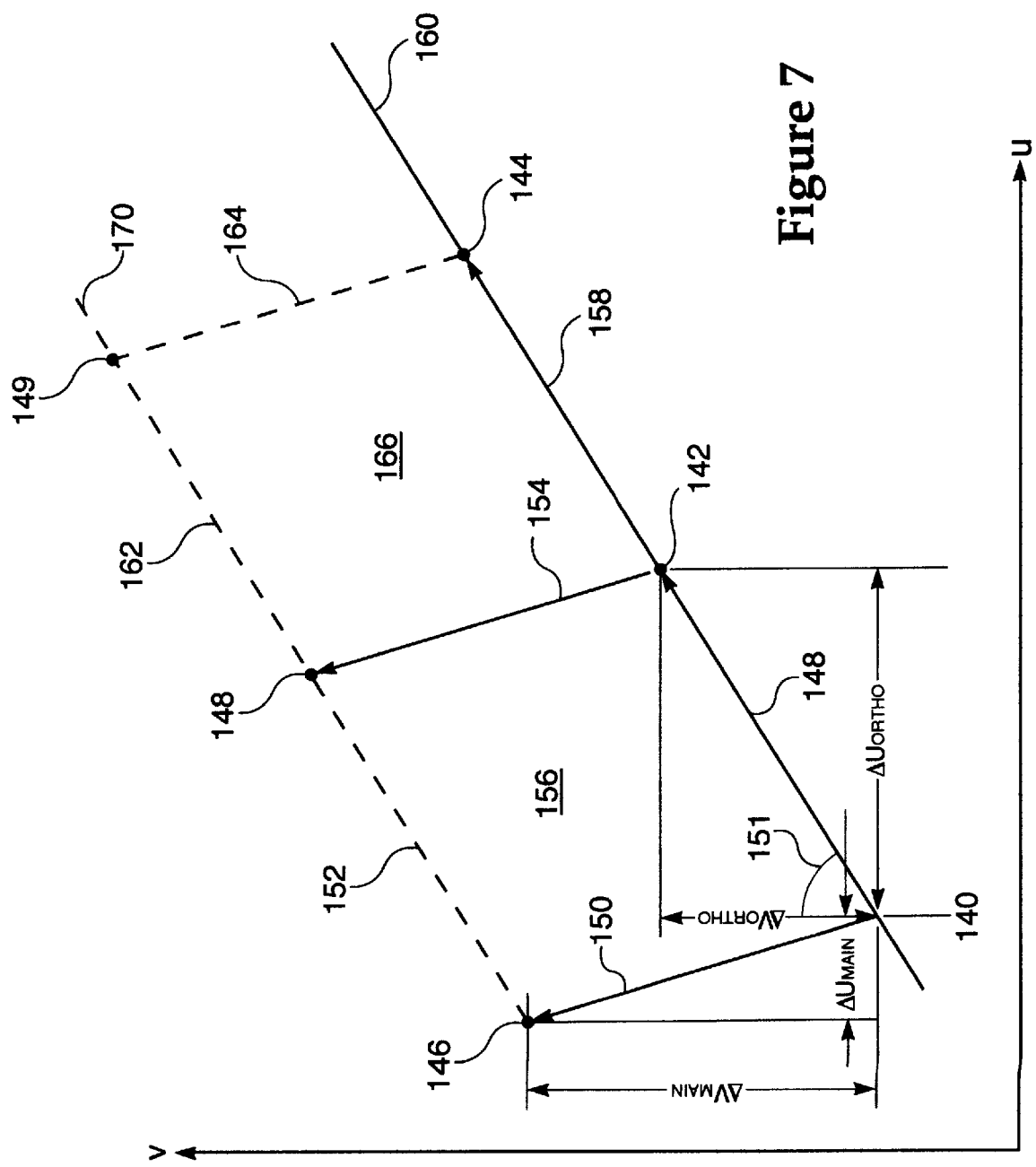
FIG. 7 shows the MIP mapping technique of the preferred embodiment to determine which of a set of texture maps with varying levels of detail to use when rendering portion of a polygon.

Referring now to FIG. 7, exemplary texels 140, 142, 144, 146, 148 from a texture map are shown in relation to the u and v axes. Texels 140, 142, 144 are texels along ORTHO scan line 160 and texels 146, 148 are texels along ORTHO scan line 170. In accordance with the interpolation technique explained above, the u,v address of texels and the delta values to the next texel in both the ortho and main slopes are available. Once the coordinate of texel 140 is determined by the texture map engine 126, the coordinate of texel 142 can be calculated from the ΔU ORTHO and ΔV ORTHO values. Similarly, the ΔU MAIN and ΔV MAIN values are used to calculate the coordinate of texel 146 are known. In this manner, texel coordinate values for texels 144 and 148 can be calculated once texel coordinate 142. Moreover, given one texel coordinate from a texture map, the two adjacent coordinates can be calculated given the ΔU ORTHO, ΔV ORTHO, ΔU MAIN, and ΔV MAIN values.

Referring still to FIG. 7 and in accordance with a preferred embodiment, a uv area is computed for groups of three texels in which two of the three texels lie on a common ORTHO scan line and the third texel is on a different scan line. Texels 140, 142, and 146, for example, define a uv area 156 bounded by lines 148, 150, 152, 154. Similarly, uv area 166 defines the area associated with texels 142, 144, 148 and is the area bounded by lines 158, 154, 162, 164. The size of the uv area is proportional to the distance between texels selected by the texture map engine 126 and is thus related to the amount of compression that is appropriate.

In accordance with the preferred embodiment, the graphics processor selects texels from two LOD's and blends the selected texels together using the uv area. The uv area is a measure of the amount of compression that is appropriate for each texel value. If the uv area is 4.0, an appropriate texel is selected from LOD1 with its 4:1 compression. Similarly, a texel is selected from LOD2 with its 16:1 compression if the uv area is 16.0. Finally, a texel from LOD3 with its 64:1 compression is selected if the uv area is 64.0. It should be recognized, however, that the uv area may include values other than 4.0, 16.0, and 64.0.

Figure 9:
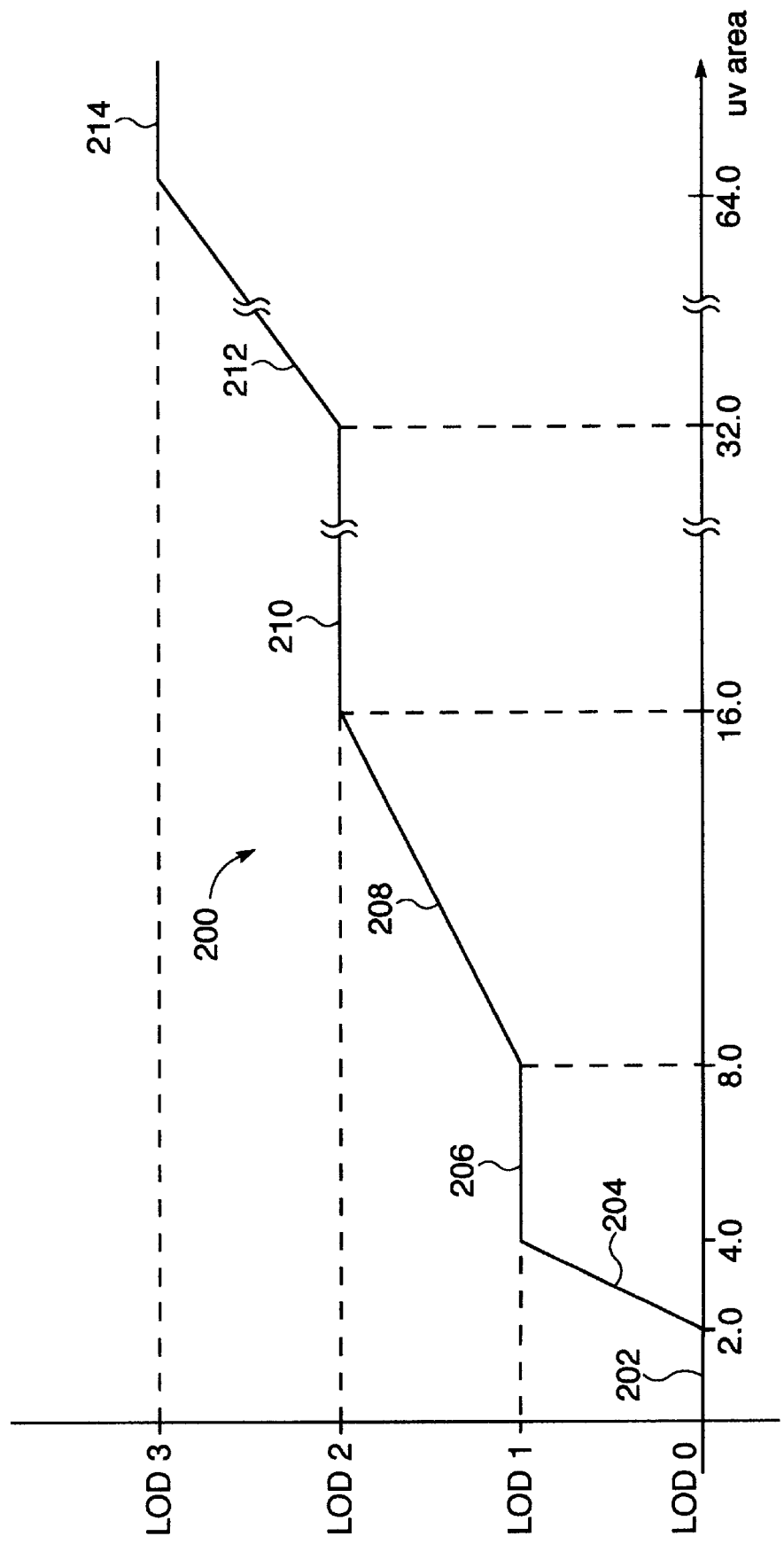
FIG. 9 is a graph showing how texels from more than one texture map are blended together in accordance with the preferred embodiment.

Referring now to FIG. 9, the preferred technique for blending LOD's will now be described. FIG. 9 shows a graph in which uv area is plotted on the horizontal axis and LOD is shown on the vertical axis. The relationship between the LOD's and the uv area is shown by segmented line 200 which includes segments 202, 204, 206, 208, 210, 212, and 214. Flat segments 202, 206, 210, and 214 indicate that no blending occurs fo uv areas that fall within the uv area range associated with each of these flat segments. Thus, no blending occurs if the uv area is in the range of 0 to 2.0, 4.0 to 8.0, 16.0 to 32.0, and greater than 64.0. Graphics processor 120 selects a texel from LOD0 if the uv area lies in flat segment 202. Similarly, graphics processor selects a texel from LOD1 is the uv area is in segment 206, a texel from LOD2 if the uv area is in segment 210, and a texel from LOD3 if the uv area is in segment 214.

Texels from two LOD's preferably are blended together in a weighted average based on the uv area value if the uv area is in non-flat segments 204, 208, and 212. Thus, texels form LOD0 and LOD1 are averaged together when the uv area lies in segment 204. Likewise, texels from LOD1 and LOD2 are averaged when uv area is in segment 208 and texels from LOD2 and LOD3 are averaged when uv area is in segment 208 and texels from LOD2 and LOD3 are averaged if the uv area lies in segment 212. The averaging is based on a scale factor associated with the uv area value and calculated by the texture map engine 126. The scale factor represents the percentage of the uv area range of each non-flat segment 204, 208, 212 corresponding to a uv area value. The graphics processor 120 calculates a scale factor associated with uv areas in segment 204 as:

$$\text{scale}_{01} = (|uv\text{area}| - 2)/2 \qquad (1)$$

Where the vertical lines "|" around uv area indicates the absolute value of the uv area is to be used in equation (1). Subtracting a value of 2 normalizes the segment 204 to uv area values in the range of 0 to 2, rather than 2 to 4, and dividing by 2 computes the location of the uv area within the normalized range and is expressed as a percentage of the total range, 2. For example, a uv area value of 3.0 is halfway between 2.0 and 4.0 and, using equation (1), results in a $\text{scale}_{01}$ factor of 0.5.

Scale factors for segments 208 and 212 are similarly calculated using equations (2) and (3) below:

$$\text{scale}_{12} = (|uv\text{area}| - 8)/8 \qquad (2)$$

$$\text{scale}_{23} = (|uv\text{area}| - 32)/32 \qquad (3)$$

where $\text{scale}_{12}$ is a scale factor for uv areas within segment 208 and $\text{scale}_{23}$ is a scale factor for uv areas within segment 212.

Once calculated, the graphics processor uses a scale factor to blend texels from two LOD's based on the scale factor. The scale factors represent weights used by the graphics processor 120 to computed weighted average of texels. The texture map engine 126 averages texels from LOD0 and LOD1 as:

$$\text{texel}_{01} = (\text{texel}_0)(1-\text{scale}_{01}) + (\text{texel}_1)(\text{scale}_{01}) \qquad (4)$$

where $\text{texel}_0$ refers to a texel from LOD0, $\text{texel}_1$ refers to a texel from LOD1, and $\text{texel}_{01}$ refers to the weighted average of $\text{texel}_0$ and $\text{texel}_1$. $\text{Texel}_{01}$ is thus used to render texture on a pixel in a polygon. Similarly, texels from LOD1 and LOD2 and LOD2 and LOD3 are averaged per equations (5) and (6):

$$\text{texel}_{12} = (\text{texel}_1)(1-\text{scale}_{12}) + (\text{texel}_2)(\text{scale}_{12}) \qquad (5)$$

$$\text{texel}_{23} = (\text{texel}_2)(1-\text{scale}_{23}) + (\text{texel}_3)(\text{scale}_{23}) \qquad (6)$$

where $\text{texel}_2$ and $\text{texel}_3$ represent texels from LOD2 and LOD3, respectively, $\text{texel}_{12}$ is the weighted average of $\text{texel}_1$ and $\text{texel}_2$, and $\text{texel}_{23}$ is the weighted average of $\text{texel}_2$ and $\text{texel}_3$. Graphics processor 120 thus uses $\text{texels}_{12}$ and $\text{texels}_{23}$ to render texture in a polygon for uv areas lying within segments 208, 212.

The uv area values in FIG. 9 that mark the beginning and end points of the various segments are preferred, but other beginning and end points are acceptable. The beginning and end points shown in FIG. 9 were chosen to make calculating the scale factors simpler and faster. Dividing a number by (2n) where n is an integer is merely a bit shift operation by n bits and is easily performed by common shift registers. Similarly, subtraction by 2, 8, and 32 also is simple.

Although numerous techniques known to those of ordinary skill in the art may be used to compute the uv areas, the following technique is preferred because of its simplicity and low computational overhead (few memory accesses and calculations). An arrow or vector is assigned to the texels as shown in FIG. 7. Vector 128 begins at texel 140 and ends at texel 142. Vector 150 also begins at texel 140 and ends at texel 146. The uv area 156 is determined from the "cross product" (also referred to as the "vector product") of vectors 148 and 150. The cross product of two vectors (P and Q, for example) typically is represented as P×Q. The cross product of vectors P and Q results in a third vector V which points in a direction perpendicular to the plane defined by the two vectors P and Q (i.e., into or out of the page). The magnitude or length of the resulting vector V is the product of the magnitudes of the vectors and the sine of the angle formed between the vectors. Thus, the uv area 156 can be calculated as the length of vector 148 times the length of vector 150 times angle 151.

Figure 8:
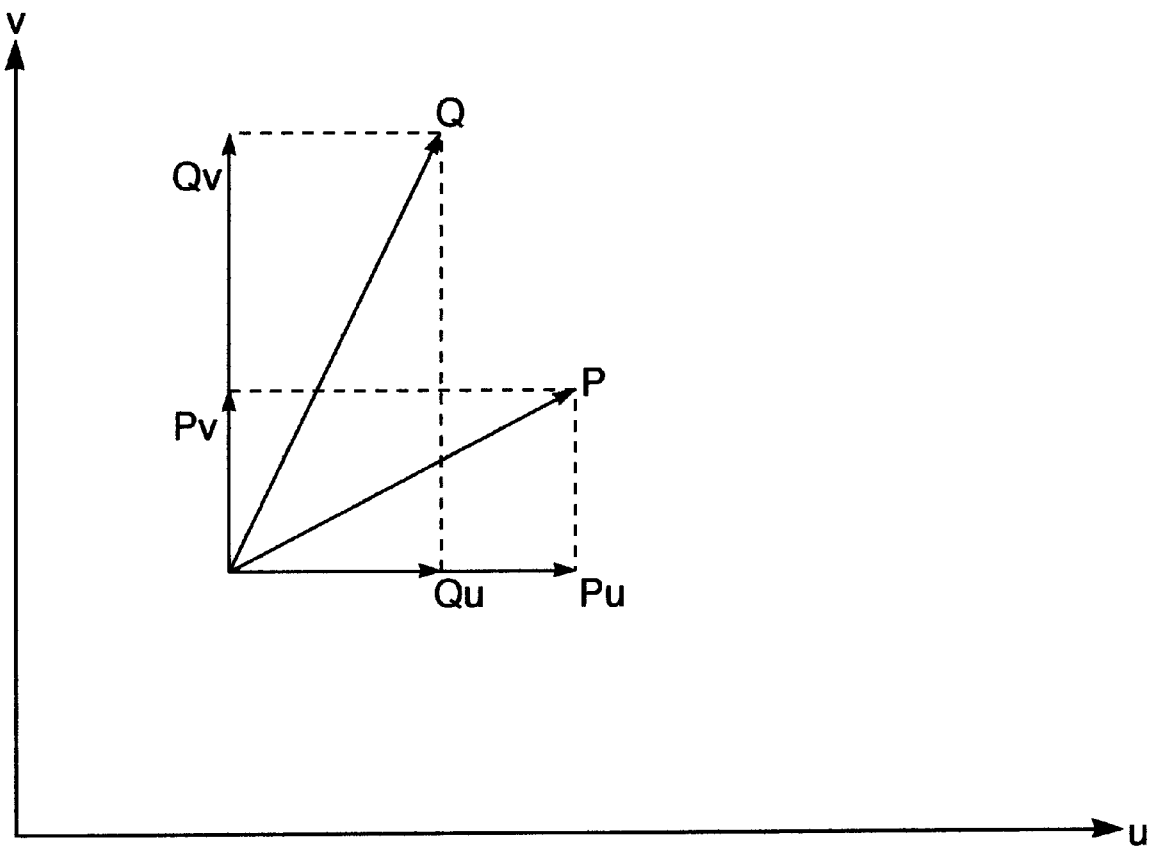
FIG. 8 is a graph showing exemplary vectors represented by their rectangular coordinates.

Referring to FIG. 8, two vectors P and Q are shown represented by their rectangular components $P_u$ and $P_v$ and $Q_u$ and $Q_v$. The magnitude of the cross product of the vectors P and Q may alternatively be calculated as:

$$V = P_x Q_y - P_y Q_x \qquad (7)$$

Referring to FIG. 7, the magnitude of the vector resulting from the cross product of vectors 148 and 150 (i.e., the uv area 156) thus is calculated as:

$$uv\ \text{area} = (\Delta V\ \text{MAIN} * \Delta U\ \text{ORTHO}) - (\Delta U\ \text{MAIN} * \Delta V\ \text{ORTHO}) \qquad (8)$$

The texture map engine 126 computes a uv area preferably using equation (2) above for each texel selected from a texture map. The size of the uv area dictates the blending of texels from various LOD texture maps. Thus, the preferred embodiment provides high quality graphics with little, if any, abrupt changes in texturing when rendering a polygon.

The MIP mapping technique used by the graphics processor 120 requires few system memory accesses and computations to calculate the uv area values. In fact, the values used in equation (8) are already provided to the graphics processor in the display list (see Table I). Further, only two multiply operations and one subtraction is required to compute each uv area defined by equation (8). The end points of the non-flat segments in FIG. 9 were chosen to minimize the hardware needed to compute the scale factors.

Numerous variations and modifications will become apparent to those skilled in the art once the above disclosure is fully appreciated. It is intended that the following claims be interpreted to embrace all such variations and modifications.

What is claimed is:

1. A graphics processor that receives parameters defining a polygon from a host processor and rendering said polygon with texture in successive orthogonal scan lines, said texture stored in a set of texture maps, each texture map including one or more texel values identified by a texel coordinate and each texture map in said set varying by the number of texel values, comprising:

a polygon engine for determining a starting x coordinate, a starting y coordinate, a width for each scan line, and a counter defining the number of scan lines; and a texture map engine for blending together texel values from more than one texture map based upon an area calculated by said texture map engine for a texel coordinate based on a cross product of vectors defined by texel coordinates in a texture map.

2. A graphics processor as in claim 1, wherein said texture map engine generates a first texel coordinate, a second texel coordinate, and a third texel coordinate and said texture map engine defines a first vector beginning on said first texel coordinate and ending on said second texel coordinate and a second vector beginning on said first texel coordinate and ending on said third texel coordinate and wherein said texture map engine determines said area by calculating a magnitude of a cross product of said first and second vectors.

3. A graphics processor as in claim 2, wherein each texel coordinate is defined by a u,v coordinate, and said parameters defining said polygon include a $\Delta U$ ORTHO value which is the amount by which each u coordinate is adjusted on each increment in the x coordinate as the polygon is rendered, a $\Delta U$ ORTHO value which is the amount by which each v coordinate is adjusted for each increment in the x coordinate, a $\Delta U$ MAIN value which is the amount by which the u coordinate is adjusted for each increment in the y coordinate, a $\Delta V$ MAIN value which is the amount by which the v coordinate is adjusted for each increment in the y coordinate, and said texture map engine calculates said cross product as:

$$(\Delta V\ MAIN * \Delta U\ ORTHO) - (\Delta U\ MAIN * \Delta V\ ORTHO).$$

4. A graphics processor as in claim 3, wherein said set of texture maps includes a first level of detail ("LOD") texture map, a second LOD texture map, a third level of detail texture map, and a fourth level of detail texture map, said texture map engine selects a texel value from said first level of detail if said area is within a first range of values.

5. A graphics processor as in claim 4, wherein said texture map engine selects a texel value from said second level of detail texture map if said area is within a second range of values.

6. A graphic processor as in claim 5, wherein said texture map engine selects a texel value from said third level of detail texture map if said area is within a third range of values.

7. A graphics processor as in claim 6, wherein said texture map engine selects a texel value from said fourth level of detail texture map if said area is within a fourth range of values.

8. A graphics processor as in claim 7, wherein said first range of values includes values less than 2.

9. A graphics processor as in claim 8, wherein said second range of values includes values between 4 and 8, including 4.

10. A graphics processor as in claim 9, wherein said third range of values includes values between 16 and 32, including 16.

11. A graphics processor as in claim 10, wherein said fourth range of values includes values greater than or equal to 64.

12. A graphics processor as in claim 11, wherein said texture map engine blends texel values from said first and second level of detail texture maps when said area is in within a range of 2 to 4, including 2.

13. A graphics processor as in claim 11, wherein said texture map engine blends said texel values by computing a weighted average of said texel values based on a scale factor.

14. A graphics processor as in claim 13, wherein said texture map engine computes said scale factor by subtracting 2 from the absolute values of said area and dividing by 2.

15. A graphic processor as in claim 14, wherein said texture map engine blends texel values from said second and third level of detail texture maps when said area is within a range of 8 to 16 including 8, by computing a weighted average of said texel values based on said area.

16. A graphics processor as in claim 15, wherein said texture map engine blends texel values from said third and fourth level of detail texture maps when said area is within a range of 32 to 64 including 32.

17. A method of determining texels values from multiple texture maps from a set of texture maps in which each texture map includes at least one texel value with a texel coordinate and the texture maps in the set vary by the number of texel coordinates, comprising:

defining initial texture parameters for a polygon including an initial u, v texel coordinate of a first scan line, a $\Delta U$ ORTHO value, a $\Delta V$ ORTHO value, a $\Delta U$ MAIN value, and a $\Delta V$ MAIN value;

defining a second texel coordinate on said first scan line;

defining third and a fourth texel coordinates on a second scan line, said third texel coordinate representing the first texel on said second scan line;

calculating an area bounded by said initial u, v texel coordinate, second texel coordinate, third texel coordinate, and fourth texel coordinate based on a cross product of vectors defined by said initial u, v texel coordinate, second texel coordinate and third texel coordinate;

determining a texel value from said texture maps based on said area.

18. A method as in claim 17, wherein said step of calculating an area includes:

defining a first vector from said initial u, v texel coordinate to said second texel coordinate;

defining a second vector from said initial u, v texel coordinate to said third texel coordinate;

calculating the cross product of said first and second vectors; and determining the area from the magnitude of the cross product.

19. A method as in claim 18, wherein said second texel coordinate is defined by adding said $\Delta U$ ORTHO value to the initial u coordinate and the $\Delta V$ ORTHO value to the initial v coordinate, and the third texel coordinate is defined by adding the $\Delta U$ MAIN value to the initial u coordinate and the $\Delta V$ MAIN value to the initial v coordinate, and said step of calculating the area includes calculating ($\Delta V$ MAIN* $\Delta U$ ORTHO)–($\Delta U$ MAIN* $\Delta V$ ORTHO).

20. A method as in claim 19 wherein said set of texture maps includes a first level of detail texture map, a second level of detail texture map, a third level of detail texture map, and a fourth level of detail texture map, and said step of determining a texel value from said texture maps based on said area includes selecting a texel value from said first level of detail texture map if said area is less than 2.

21. A method as in claim 20 wherein said step of determining a texel value from said texture maps also includes selecting a texel value from said second level of detail texture map if said area is between 4 and 8, including 4.

22. A method as in claim 21 wherein said step of determining a texel value from said texture maps also includes selecting a texel value from said third level of detail texture map if said area is between 16 and 32, including 16.

23. A method as in claim 22 wherein said step of determining a texel value from said texture maps also includes selecting a texel value from said fourth level of detail texture map if said area is greater or equal to 64.

24. A method as in claim 23, wherein said step of determining texel values based on said area includes blending texel values from multiple texture maps.

25. A method as in claim 24 wherein blending texel values includes calculating a weighted average of texel values form said multiple texture maps, said weighted average based on said area.

26. A method as in claim 25 wherein calculating a weighted average is performed when said area is within one of a first range, a second range, and a third range of values.

27. A method as in claim 26 wherein said first range includes 2 to 4 including 2, said second range includes 8 to 16 including 8, and said third range includes 32 to 64 including 32.

28. A computer system, comprising:
   a system bus;
   a processor coupled to said system bus;
   a display unit including a grid of pixels;
   a graphics controller coupled to system bus and also coupled to said display unit for rendering polygons in the grid of pixels; and
   a register file receiving parameters from the processor to define a polygon to be drawn with texture in said grid of pixels;
   wherein said graphics controller includes:
      a polygon engine for rendering said polygon on said display unit; and
      a texture map engine for determining texel values from a texture map included in a set of texture maps, said texel values to be applied to said polygon, and said texel values including texel coordinates, wherein said texture map engine determines a texel value based upon an area determined by a cross product of vectors defined by coordinates in a texture map.

29. A computer system as in claim 28 wherein said texture map engine receives a first texel coordinate, a second texel coordinate, and a third texel coordinate, and defines a first vector from said first texel coordinate to said second texel coordinate and a second vector from said first texel coordinate to said third texel coordinate and calculates the cross product of said first and second vectors.

30. A computer system as in claim 29 wherein said texture map engine selects determines a texel value based upon a comparison of said cross product with a range of values.

31. A computer system as in claim 30 wherein said set of texture maps includes a first level of detail texture map, a second level of detail texture map, a third level of detail texture map, a fourth level of detail texture map, and said texture map engine selects a texel value from said first level of detail texture map if said area lies in a first range of values, said texture map engine selects a texel value from said second level of detail texture map if said area lies in a second range of values, said texture map engine selects a texel value from said third level of detail texture map if said area lies in a third range of values, and said texture map engine selects a texel value from said fourth level of detail texture map if said area lies in a fourth range of values.

32. A computer system as in claim 31 wherein said first range includes values less than 4, said second range includes values between 4 and 16, including 4, said third range includes values between 16 and 64, including 64, and said fourth range includes values greater than or equal to 64.

33. A computer system as in claim 32 wherein said texture map selects more than one texel value from said texture maps and computes a weighted average of said texel values based on said area.

34. A computer system as in claim 33 wherein said texture map engine computes said weighted average when said area is within one of a first range, a second range, and a third range of values.

35. A computer system as in claim 34 wherein said first range includes 2 to 4 including 2, said second range includes 8 to 16 including 8, and said third range includes 32 to 64 including 32.

36. A graphics processor that receives parameters defining a polygon from a host processor and rendering said polygon with texture in successive orthogonal scan lines, said texture stored in a set of texture maps, each texture map including one or more texel values identified by a texel coordinate and each texture map in said set varying by the number of texel values, comprising:
   a register file for storing said parameters;
   a polygon engine for determining a starting x coordinate, a starting y coordinate, a width for each scan line, a counter defining the number of scan lines; and
   a texture map engine for blending together texel values from more than one texture map, said blending of texels based upon an area calculated by said graphics processor for a texel coordinate;
   wherein said texture map engine generates a first texel coordinate, a second texel coordinate, and a third texel coordinate and said texture map engine defines a first vector beginning on said first texel coordinate and ending on said second texel coordinate and a second vector beginning on said first texel coordinate and ending on said third texel coordinate and wherein said texture map engine calculates a cross product of said first and second vectors and determines said area from the magnitude of the cross product;
   wherein said first and second vectors each have a length and include an angle between said vectors, and said texture map engine calculates said cross product as the length of said first vector times the length of said second vector times said angle.

37. A method of determining texels values from multiple texture maps from a set of texture maps in which each texture map includes at least one texel value with a texel coordinate and the texture maps in the set vary by the number of texel coordinates, comprising:
   defining initial texture parameters for a polygon including an initial u, v texel coordinate of a first scan line, a $\Delta U$ ORTHO value, a $\Delta V$ ORTHO value, a $\Delta U$ MAIN value, and a $\Delta V$ MAIN value;
   defining a second texel coordinate on said first scan line;
   defining third and a fourth texel coordinates on a second scan line, said third texel coordinate representing the first texel on said second scan line;
   calculating an area bounded by said initial u, v texel coordinate, second texel coordinate, third texel coordinate, and fourth texel coordinate; by
   defining a first vector from said initial u, v texel coordinate to said second texel coordinate;
   defining a second vector from said initial u, v texel coordinate to said third texel coordinate;
   calculating the cross product of the first and second vectors by multiplying the length of the first vector by the length of the second vector and by an angle formed therebetween;
   determining the area from the magnitude of the cross product; and
   determining a texel value from said texture maps based on said area.

38. A method as in claim 37 further including:
   determining texel coordinates for all texel values to be applied to said polygon;
   calculating areas for all texel coordinates applied to said polygon;
   determining the appropriate texture map based upon said area each time an area is calculated.

* * * * *